United States Patent [19]

Welner

[11] Patent Number: 5,689,247
[45] Date of Patent: Nov. 18, 1997

[54] AUTOMATED SYSTEM FOR IDENTIFYING AUTHORIZED SYSTEM USERS

[75] Inventor: Stephen Welner, Martinsville, N.J.

[73] Assignee: Ortho Pharmaceutical Corporation, Raritan, N.J.

[21] Appl. No.: 367,535

[22] Filed: Dec. 30, 1994

[51] Int. Cl.⁶ .................................................. H04L 9/32
[52] U.S. Cl. ........................ 340/825.31; 340/825.34; 379/95; 380/23; 380/25; 341/24; 341/25
[58] Field of Search .............. 340/825.31, 825.34, 340/825.5, 825.52, 825.53; 379/67, 91, 95, 106; 380/23–25; 341/20, 21, 24, 25; 395/800

[56] References Cited

U.S. PATENT DOCUMENTS

| | | | |
|---|---|---|---|
| 4,376,279 | 3/1983 | Perlman et al. | 340/825.34 X |
| 4,797,920 | 1/1989 | Stein | 340/825.34 X |
| 4,935,962 | 6/1990 | Austin | 340/825.34 X |
| 5,083,272 | 1/1992 | Walker et al. | 379/91 X |
| 5,371,767 | 12/1994 | Bocinsky, Jr. | 340/825.34 X |
| 5,509,064 | 4/1996 | Welner et al. | 379/67 X |

FOREIGN PATENT DOCUMENTS 0 143 096  5/1985  European Pat. Off. ......... 340/825.34

Primary Examiner—Michael Horabik
Assistant Examiner—William H. Wilson, Jr.
Attorney, Agent, or Firm—Paul A. Coletti

[57] ABSTRACT

A method and apparatus for identifying authorized users of a secure system. A user of the secure system is prompted to enter a personal identification code which is then received into the secure system. The personal identification code entered by the user is then compared against a list of authorized personal identification codes. The user is identified to be an authorized user of the secure system only if the personal identification code entered by the user is present in the list of authorized personal identification codes. Each personal identification code on the list of authorized personal identification codes is arranged in a personal identification code format that includes a plurality of core digits and a plurality of check digits. A first of the check digits has a value that is dependent upon a first group of two or more core digits, and a second of the check digits has a value that is dependent upon a second group of two or more core digits, the first group of two or more core digits being different from the second group of two or more core digits.

24 Claims, 2 Drawing Sheets

1

AUTOMATED SYSTEM FOR IDENTIFYING AUTHORIZED SYSTEM USERS

BACKGROUND OF THE INVENTION

The present invention relates generally to automated systems for identifying authorized users of secure systems. More particularly, the present invention is directed to a system for identifying whether individual call-in users to a secure system should be permitted to have access to the system. Still more particularly, the present invention relates to a system for securely and accurately delivering confidential medical test results over the telephone to individuals that have used an in home test kit to test for the presence of the HIV virus (human immunodeficiency virus) which is known to cause AIDS (Acquired Immune Deficiency Syndrome).

AIDS is viewed by many as the single most serious modern-day health issue affecting society. Since there is presently no known cure for the disease, early detection and treatment of the HIV virus provides the best chance of helping a patient to prolong his or her life by delaying onset of the disease. In addition, early detection is crucial to preventing the spread of the virus itself.

Although early detection of the virus is vitally important, only about 8% of adult Americans are tested annually. Individuals have been reluctant to submit to testing because, among other things, they fear that a positive test result will not be kept confidential. It is currently estimated that the number of at-risk individuals being tested for the HIV virus would increase to approximately 29% if a diagnostic procedure was available the could assure an individual's confidentiality.

The present invention relates to a confidential at-home test system for determining whether an individual may be carrying the HIV virus. An individual uses the at home system by purchasing a test kit at a pharmacy or other retail outlet. The test kit contains a test card for carrying a sample of the individual's blood to a testing lab. The test card contains a unique personal identification code printed thereon. The individual using the test kit places several drops of his or her blood onto the test card while at home, and then mails the test card to a central laboratory for testing. Prior to mailing the test card to the central testing laboratory, the individual maintains a record of the unique personal identification code that appeared on his or her test card. Significantly, the individual user includes no information relating to his or her identity (e.g., name, address, telephone number, etc.) with the test card when it is mailed to the testing laboratory. Several days after mailing the test card to the central testing laboratory, the individual calls a central phone number to get his or her test results.

When the central phone number receives a call from a user desiring to learn test result information, the call processing system must initially determine whether to grant the caller access to the system. Since no information relating to the user's identity is known to the call processing system, the call processing system prompts the caller to enter (via his or her telephone) the personal identification code that was printed on the caller's test card. Based on the personal identification code entered by the caller, the call processing system must determine whether the caller is an authorized user of the system and, if so, what test results should be reported to the caller.

As described more fully in U.S. Pat. No. 5,612,870 (unknown), entitled "System for Tracking Secure Medical Test Cards" the contents of which is incorporated herein in its entirety by reference, a central list of all authorized personal identification codes for use with the at-home testing system is maintained in a central database that is coupled to the call processing system. Each authorized personal identification code appearing on this list corresponds to one of the at-home test kits that was shipped to a pharmacy or other retail outlet for purchase by an individual user. Whether an individual caller is granted access to the call processing system is dependent upon whether the caller can enter a personal identification code that matches one of the authorized personal identification codes listed on the central database. In addition, all test result information determined by the central testing laboratory from test cards provided by the test kit users is stored in a central test result database which is also coupled to the call processing system. The test result information in this database is stored and retrieved based solely on the personal identification codes that appeared on the test cards provided to the testing laboratory.

In the event that a caller attempting to gain access to the call processing system incorrectly enters his associated personal identification code, there are two possible outcomes. First, if the incorrect personal identification code entered by the caller does not match any of the authorized personal identification codes stored in the central database described above, the caller will be given an error message that he or she has entered an invalid personal identification code and access to the call processing system will be denied. Alternatively, if the incorrect personal identification code entered by the caller happens by coincidence to match one of the authorized personal identification codes stored in the central database described above, then the caller will not only be given access to the call processing system, but he or she may mistakenly be given test result information associated with a different test kit user (whose personal identification code corresponded to the incorrect personal identification code entered by the caller). This second alternative presents a troubling situation because the caller may have received the wrong test results.

Callers attempting to enter personal identification codes into a call processing system through their touch-tone telephone buttons may make two common types of keying errors. First, the callers may transpose adjacent digits of their personal identification code as they are keying their code into the system. Second, the users may mistakenly strike a touch-tone button adjacent to an intended button as they are keying their code into the system. This second type of error is referred to as a "fat-finger" keying error and will occur, for example, when a caller who intends to depress the "2" button on his telephone instead mistakenly strikes one of the five buttons adjacent to the "2" button. In the event that a caller calling into the central call processing system makes either a "transposition" or "fat-finger" keying error, it is important that there be no match between the incorrect code that was entered and any of the authorized personal identification codes stored on the database described above. If such a match can be avoided, then a caller making such a keying error will never be given incorrect test result information by the call processing system.

It is therefore an object of the present invention to provide a system for identifying whether individual call-in users to a secure system should be permitted to have access to the system.

It is a further object of the present invention to provide a system for securely delivering confidential medical test results over the telephone to individuals that have used an in-home test kit to test for the presence of the HIV virus.

It is a still further object of the present invention to provide a system for accurately delivering confidential medical test result information to individuals who are known to the system only by a unique personal identification code and which protects against the delivery of incorrect confidential medical test result information to individuals who have made keying errors during entry of their personal identification codes.

These and still other objects of the invention will become apparent upon study of the accompanying drawings and description of the invention.

SUMMARY OF THE INVENTION

The present invention is directed to a method and apparatus for identifying authorized users of a secure system. A user of the secure system is prompted to enter a personal identification code which is then received into the secure system. The personal identification code entered by the user is then compared against a list of authorized personal identification codes. The user is identified to be an authorized user of the secure system only if the personal identification code entered by the user is present in the list of authorized personal identification codes. Each personal identification code on the list of authorized personal identification codes is arranged in a personal identification code format that includes a plurality of core digits and a plurality of check digits. A first of the check digits has a value that is dependent upon a first group of two or more core digits, and a second of the check digits has a value that is dependent upon a second group of two or more core digits, the first group of two or more core digits being different from the second group of two or more core digits.

DETAILED DESCRIPTION OF THE PREFERRED EMBODIMENT

Figure 1:
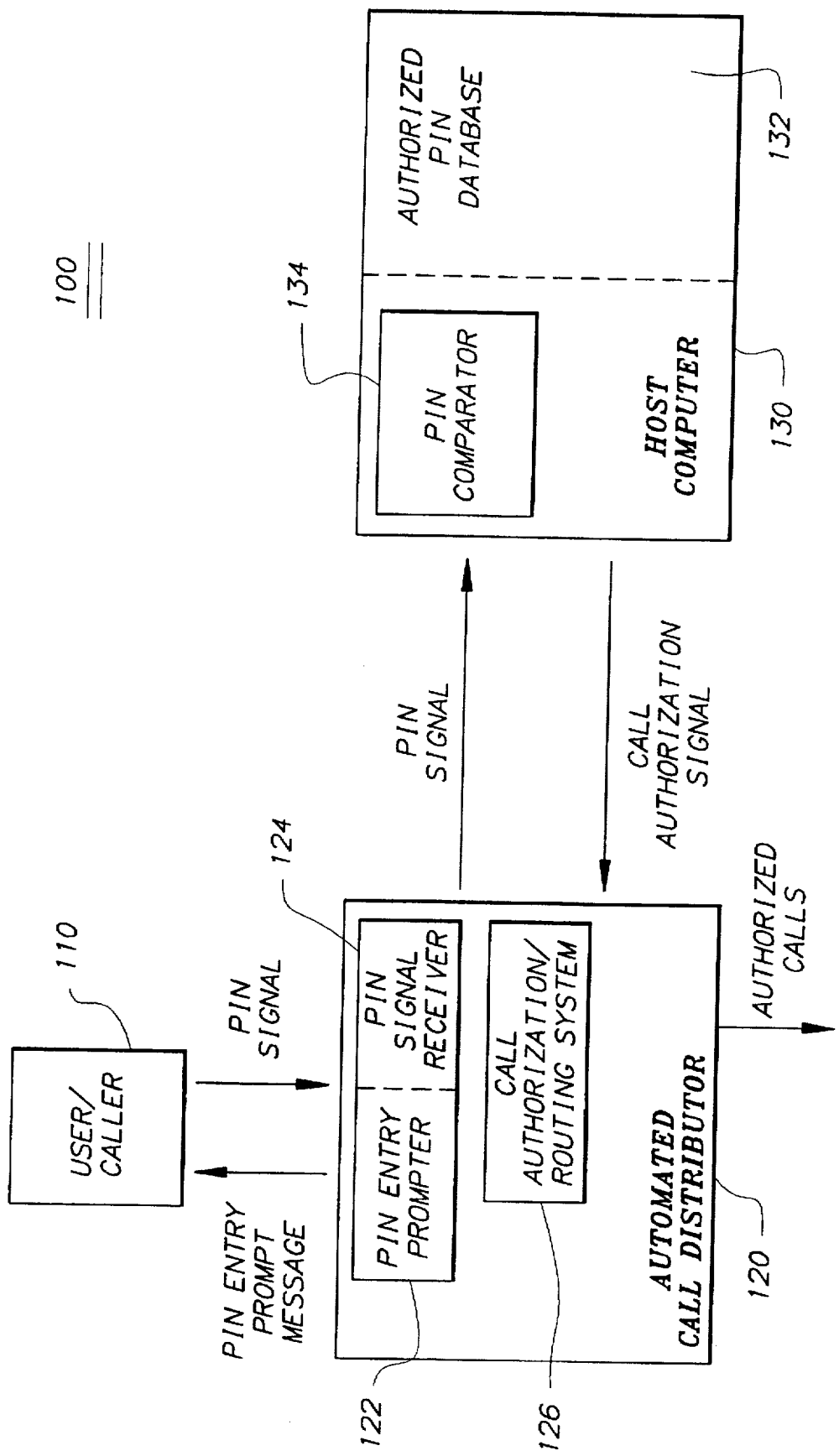
FIG. 1 shows a block diagram of an automated system for identifying authorized system users in accordance with a preferred embodiment of the present invention.

Referring now to FIG. 1, there is shown a block diagram of an automated system 100 for identifying authorized system users in accordance with a preferred embodiment of the present invention. In system 100, callers 110 who have used an at-home HIV test kit place telephone calls to automated call distributor 120 in order to obtain test result information. Upon receiving an incoming call, a prompting system 122 plays a recorded message for caller 110 prompting the caller to enter the personal identification number (PIN) from the caller° s at home test kit into automated call distributor 120 via the touch-tone buttons on the caller's telephone. As caller 110 keys his or her PIN into their telephone, a PIN signal is transmitted to and received by a PIN signal receiver 124 within automated call distributor 120. Upon receipt of this signal by receiver 124, a further signal representative of the PIN entered by caller 110 is transmitted from automated call distributor 120 to a host computer 130.

Most computer 130 has an authorized PIN database 132 coupled thereto. Each authorized PIN listed in database 132 preferably corresponds to an at-home test kit that was shipped to a pharmacy or other retail outlet for purchase by an individual user. Host computer 130 also includes a PIN comparator 134 which is coupled to authorized PIN database 132. Upon receipt by host computer 130 of the PIN signal provided by automated call distributor 120, PIN comparator 134 determines whether the PIN entered by caller 110 corresponds to one of the authorized PINs listed on database 132. Following this determination, PIN comparator 134 sends a call authorization signal identifying whether caller 110 is an authorized user of the system to call authorization/routing system 126 within automated call distributor 120. The caller 110 will be identified by PIN comparator 134 as an authorized user of the system only if the PIN entered by caller 110 is present on the list of generated PINs stored in PIN database 132. If the call authorization signal received by call authorization/routing system 126 indicates that caller 110 is an authorized caller, then the call will be accepted and routed for further handling. In the event that the call authorization signal received by call authorization/routing system 126 indicates that caller 110 is not an authorized user of the system, caller 110 will either be given a further opportunity to enter an authorized PIN or the call will be terminated.

A suitable automated call distributor 120 for use with the present invention is manufactured by the Aspect Corporation under model number 100. A suitable host computer for use with the present invention is a Hewlett-Packard model 9000 computer.

As mentioned above, in the event that a caller 110 makes either a "transposition" or "fat-finger" keying error when entering his PIN into automated call distributor 110, it is important that there be no match between the incorrect PIN that was entered and any of the authorized PINs stored on database 132. In order to avoid any such matches, the present invention uses a special system 200 for generating the PINs that are printed on the test cards and which form the list of authorized PINs stored on database 132. System 200 generates a set of authorized PINs such that no two PINs in the set represent either a "transposition" error or "fat-finger" permutation of any other PIN in the set.

Figure 2:
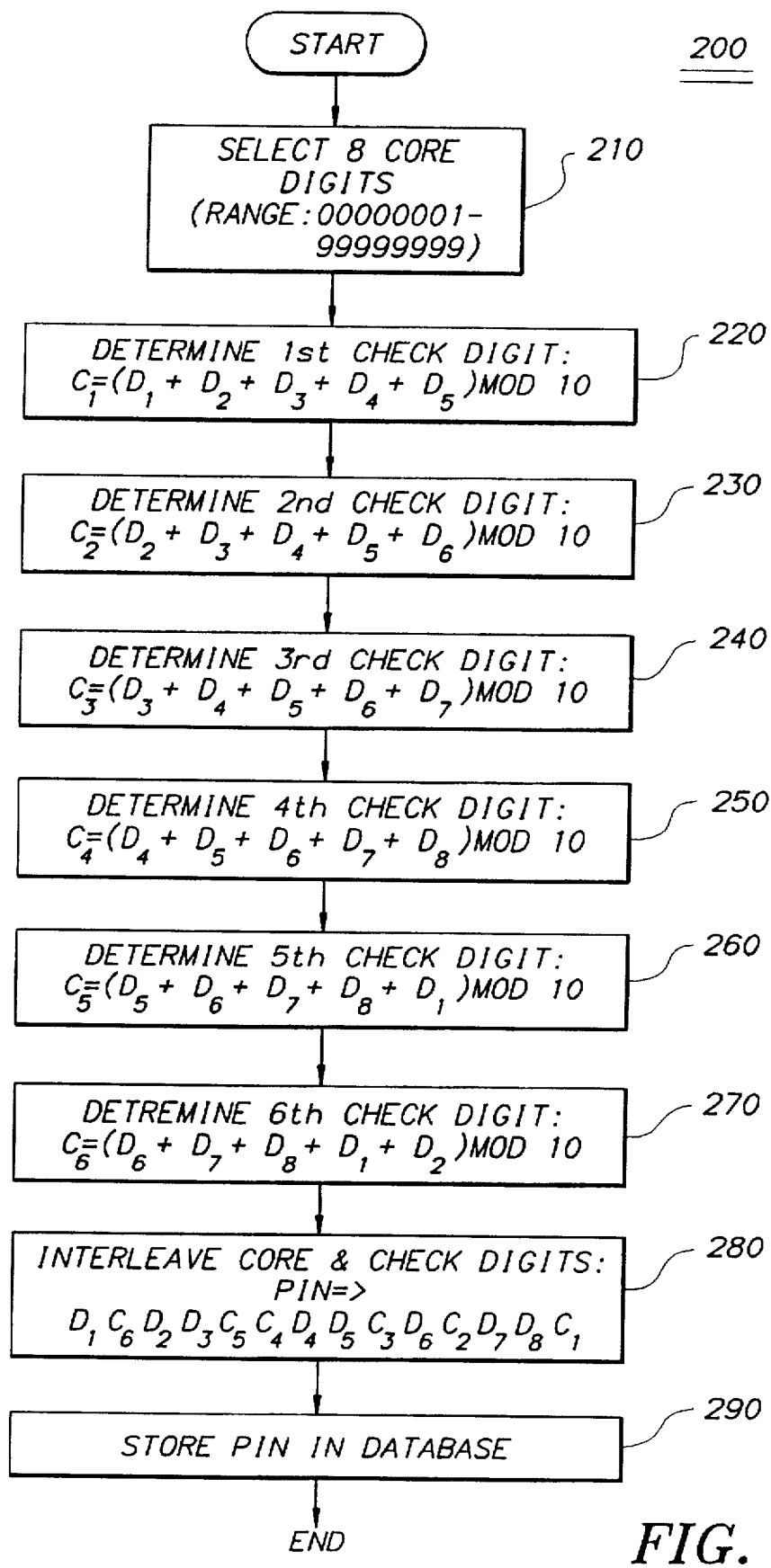
FIG. 2 shows a flow diagram illustrating the operation of a system for generating a set of secure personal identification codes for use in conjunction with the automated system of FIG. 1.

Referring now to FIG. 2, there is shown a flow diagram illustrating the operation of a system 200 for generating a set of secure personal identification codes for use in conjunction with automated system 100. As described more fully below, each authorized PIN generated by system 200 is preferably formed of a 14-digit numerical sequence, where each digit in the sequence is represented by either a core digit ($D_i$) or a check digit ($C_i$). The value of each check digit in the sequence is dependent on the values of a different group of core digits in the sequence. This intra-dependency between the core and check digits in each 14-digit sequence ensures that no two PINs are generated by system 200 that are either "transposition" or "fat-finger" permutations of each other.

Referring still to FIG. 2, system 200 begins in step 210 by selecting a unique 8-digit sequence of core digits ranging from 00000001 to 99999999. This 8-digit sequence of core digits may be selected randomly or sequentially. However, in the course of generating a set of authorized PINs for use in conjunction with system 100, system 200 selects a new and unique 8-digit sequence of core digits as the basis for each PIN in the set. For purposes of description, the first (or right-most) core digit in the 8-digit sequence selected in step 210 will be referred to as $D_1$, the second (or next to the right-most) core digit in the 8-digit sequence selected in step 210 will be referred to as $D_2$, etc.

Following the selection of $D_1, D_2, \ldots D_8$, in step 210, system 200 proceeds to step 220 where a first of check digit ($C_1$) is determined according to equation (1) below:

$$C_1 = (D_1 + D_2 + D_3 + D_4 + D_5) \text{ MOD I} \tag{1}$$

where I is an integer and is preferably equal to 10. Thereafter, in steps 230, 240, 250, 260 and 270, system 200 determines the five other check digits ($C_2$, $C_3$, $C_4$, $C_5$, and $C_6$) to be used in the 14-digit sequence according to equations (2) through (6) below:

$$C_2 = (D_2 + D_3 + D_4 + D_5 + D_6) \text{ MOD } J \quad (2)$$

$$C_3 = (D_3 + D_4 + D_5 + D_6 + D_7) \text{ MOD } K \quad (3)$$

$$C_4 = (D_4 + D_5 + D_6 + D_7 + D_8) \text{ MOD } L \quad (4)$$

$$C_5 = (D_5 + D_6 + D_7 + D_8 + D_1) \text{ MOD } M \quad (5)$$

$$C_6 = (D_6 + D_7 + D_8 + D_1 + D_2) \text{ MOD } N \quad (6)$$

where J, K, L, M and N are integers and are all preferably equal to 10. In alternate embodiments (not shown), the integers I, J, K, L, M and N need not be equivalent to each other.

Following the determination of the six check digits, processing proceeds to step 280 where the 8 core digits (from step 210) and 6 check digits (from steps 220–270) are interleaved in a predetermined format in order to form an authorized PIN. In a preferred embodiment, these core and check digits are interleaved according to the format shown in Table I below:

$$\text{PIN} = D_1 \ C_6 \ D_2 \ D_3 \ C_5 \ C_4 \ D_4 \ D_5 \ C_3 \ D_6 \ C_2 \ D_7 \ D_8 \ C_1$$

TABLE I

Following step 280, processing proceeds to step 290 where the interleaved 14-digit sequence shown in Table I above is stored as an authorized PIN in database 132. In order to form a set of authorized PINs according to the present invention, the process described above is repeated from step 210 to form each PIN in the set. System 200 may be implemented in software on host computer 130, or on a stand alone general purpose computer.

Although the preferred embodiment described above used a specific PIN format formed of 8 core digits and 6 check digits, it will be understood by those skilled in the art that other PIN formats that include different numbers of core and/or check digits may also be used. It will also be understood by those skilled in the art that letters in addition to numbers may be used as core and/or check digits to form personal identification codes in accordance with the present invention. Finally, it will be understood by those skilled in the art that formulas other than equations (1)–(6) described above may be used for determining the check digits used with the present invention.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for identifying authorized users of a secure system, comprising the steps of:

(A) prompting a user of said secure system to enter a personal identification code into said secure system;

(B) receiving into said secure system said personal identification code entered by said user;

(C) comparing said personal identification code entered by said user against a list of authorized personal identification codes; and (D) identifying said user to be an authorized user of said secure system only if said personal identification code entered by said user is present in said list of authorized personal identification codes; wherein each personal identification code on said list of authorized personal identification codes is arranged in a personal identification code format that includes a plurality of core digits and a plurality of check digits, and wherein a first of said check digits has a value that is dependent upon a first group of two or more core digits, and a second of said check digits has a value that is dependent upon a second group of two or more core digits, said first group of two or more core digits being different from said second group of two or more core digits.

2. The method of claim 1, wherein each of said check digits has a value that is dependent upon a different group of two or more core digits.

3. The method of claim 1, wherein said core digits and said check digits are interleaved within said personal identification code format.

4. The method of claim 1, wherein said first core digit is a modulus n remainder of a sum of said first group of two or more core digits, n being a positive integer.

5. The method of claim 4, wherein n is less than or equal to ten.

6. The method of claim 5, wherein said second core digit is a modulus m remainder of a sum of said second group of two or more core digits, m being a positive integer.

7. The method of claim 6, wherein m is less than or equal to ten.

8. The method of claim 7, wherein n and m are equal.

9. The method of claim 1, wherein said secure system is comprised of a telephone call-in system for delivering confidential medical test results to a plurality of users each of whom has a unique personal identification code from said list of authorized personal identification codes associated therewith.

10. The method of claim 9, wherein each of said plurality of users is known to said telephone call-in system only by one of said authorized personal identification codes.

11. The method of claim 10, wherein step (A) comprises the step of playing a recorded message over a telephone line prompting said user to enter said personal identification code associated with said user into said telephone call-in system.

12. The method of claim 11, wherein said confidential medical test results correspond to HIV test results.

13. An apparatus for identifying authorized users of a secure system, comprising:

(A) user prompting means for prompting a user of said secure system to enter a personal identification code into said secure system;

(B) personal identification code receiving means, coupled to said user prompting means, for receiving into said secure system a first digital signal representative of said personal identification code entered by said user;

(C) storage means, coupled to said personal identification code receiving means, for storing a list of authorized personal identification codes;

(D) comparing means, coupled to said storage means, for comparing said personal identification code entered by said user against said list of authorized personal identification codes; and (E) user authorizing means, coupled to said comparing means, for receiving a second digital signal identifying whether said user is an authorized user of said secure system, said user being identified as an authorized user of said secure system only if said personal identification code entered by said user is present in said list of authorized personal identification codes;

wherein each personal identification code on said list of authorized personal identification codes is arranged in a personal identification code format that includes a plurality of core digits and a plurality of check digits, and wherein a first of said check digits has a value that is dependent upon a first group of two or more core digits, and a second of said check digits has a value that is dependent upon a second group of two or more core digits, said first group of two or more core digits being different from said second group of two or more core digits.

14. The apparatus of claim 13, wherein each of said check digits has a value that is dependent upon a different group of two or more core digits.

15. The apparatus of claim 13, wherein said core digits and said check digits are interleaved within said personal identification code format.

16. The apparatus of claim 13, wherein said first group of is a modulus n remainder of a sum of said first group of two or more core digits, n being a positive integer.

17. The apparatus of claim 16, wherein n is less than or equal to ten.

18. The apparatus of claim 17, wherein said second core digit is a modulus m remainder of a sum of said second group of two or more core digits, m being a positive integer.

19. The apparatus of claim 18, wherein m is less than or equal to ten.

20. The apparatus of claim 19, wherein n and m are equal.

21. The apparatus of claim 13, wherein said secure system is comprised of a telephone call-in system for delivering confidential medical test results to a plurality of users each of whom has a unique personal identification code from said list of authorized personal identification codes associated therewith.

22. The apparatus of claim 21, wherein each of said plurality of users is known to said telephone call-in system only by one of said authorized personal identification codes.

23. The apparatus of claim 22, wherein said user prompting means includes means for playing a recorded message over a telephone line prompting said user to enter said personal identification code associated with said user into said telephone call-in system.

24. The apparatus of claim 23, wherein said confidential medical test results correspond to HIV test results.

* * * * *

UNITED STATES PATENT AND TRADEMARK OFFICE
CERTIFICATE OF CORRECTION

PATENT NO. : 5,689,247
DATED : November 18, 1997
INVENTOR(S) : Stephen Welner

It is certified that error appears in the above-indentified patent and that said Letters Patent is hereby corrected as shown below:

Claim 16, column 7, line 18 "group of" should be -- core digit --.

Signed and Sealed this

Fifth Day of May, 1998

Attest:

BRUCE LEHMAN

Attesting Officer

Commissioner of Patents and Trademarks